United States Patent
Hattori et al.

(10) Patent No.: US 12,143,046 B2
(45) Date of Patent: Nov. 12, 2024

(54) CONTROL DEVICE, ELECTRIC COMPRESSOR, RIPPLE VOLTAGE DETECTING METHOD, AND PROGRAM

(71) Applicant: MITSUBISHI HEAVY INDUSTRIES THERMAL SYSTEMS, LTD., Tokyo (JP)

(72) Inventors: Makoto Hattori, Tokyo (JP); Toyohisa Kawashima, Tokyo (JP); Kyohei Watanabe, Tokyo (JP)

(73) Assignee: MITSUBISHI HEAVY INDUSTRIES THERMAL SYSTEMS, LTD., Tokyo (JP)

(*) Notice: Subject to any disclaimer, the term of this patent is extended or adjusted under 35 U.S.C. 154(b) by 0 days.

(21) Appl. No.: 17/766,939

(22) PCT Filed: Oct. 20, 2020

(86) PCT No.: PCT/JP2020/039408
§ 371 (c)(1),
(2) Date: Apr. 6, 2022

(87) PCT Pub. No.: WO2021/079880
PCT Pub. Date: Apr. 29, 2021

(65) Prior Publication Data
US 2024/0079985 A1    Mar. 7, 2024

(30) Foreign Application Priority Data

Oct. 24, 2019   (JP) .................................. 2019-193693

(51) Int. Cl.
*H02P 29/024*        (2016.01)
*F04B 17/03*         (2006.01)
(Continued)

(52) U.S. Cl.
CPC .......... *H02P 29/0241* (2016.02); *F04B 17/03* (2013.01); *F04B 49/065* (2013.01);
(Continued)

(58) Field of Classification Search
CPC .... H02P 29/0241; F04B 17/03; F04B 49/065; F04B 49/10
See application file for complete search history.

(56) References Cited

U.S. PATENT DOCUMENTS 8,308,442 B2 *  11/2012  Tsutsui ................. H02K 11/026
                                                         417/44.1
9,732,991 B2 *   8/2017  An ........................... F25B 1/005
(Continued)

FOREIGN PATENT DOCUMENTS

JP    3-261838 A    11/1991
JP    10-285990 A   10/1998
(Continued)

OTHER PUBLICATIONS

International Search Report for International Application No. PCT/JP2020/039408, dated Jan. 12, 2021, with English translation.
(Continued)

*Primary Examiner* — Reena Aurora
(74) *Attorney, Agent, or Firm* — Birch, Stewart, Kolasch & Birch, LLP

(57) ABSTRACT

Provided is a method for detecting a ripple voltage. A control device is provided with: an acquiring unit which acquires the voltage value of an input voltage of a battery-driven electric compressor at irregular intervals; and a waveform computing unit which computes the waveform of a ripple component of the input voltage on the basis of the acquired voltage value.

12 Claims, 4 Drawing Sheets

(51) Int. Cl.
F04B 49/06 (2006.01)
F04B 49/10 (2006.01)
(52) U.S. Cl.
CPC ...... F04B 49/10 (2013.01); *F04B 2203/0202* (2013.01); *F04B 2203/0209* (2013.01)

(56) References Cited

U.S. PATENT DOCUMENTS

| | | |
|---|---|---|
| 2004/0066200 A1 | 4/2004 | Fujioka et al. |
| 2011/0254478 A1* | 10/2011 | Poetzl ................ H02P 27/08 318/400.3 |
| 2017/0040925 A1 | 2/2017 | Sakai |

FOREIGN PATENT DOCUMENTS

| | | |
|---|---|---|
| JP | 2003-75205 A | 3/2003 |
| JP | 2004-135393 A | 4/2004 |
| JP | 2016-36200 A | 3/2016 |

OTHER PUBLICATIONS

Written Opinion of the International Searching Authority for International Application No. PCT/JP2020/039408, dated Jan. 12, 2021, with an English translation.

* cited by examiner

CONTROL DEVICE, ELECTRIC COMPRESSOR, RIPPLE VOLTAGE DETECTING METHOD, AND PROGRAM

TECHNICAL FIELD

The present disclosure relates to a control device, an electric compressor, a ripple voltage detecting method, and a program. The present application claims priority based on Japanese Patent Application No. 2019-193693 filed in Japan on Oct. 24, 2019, the contents of which are incorporated herein by reference.

BACKGROUND ART

An electric compressor is one of the components of a car air conditioner mounted on a vehicle. In a drive circuit that drives the electric compressor, a ripple voltage may be generated. When the ripple voltage becomes large, resonance occurs and an excessive current flows.

PTL 1 discloses a technique for detecting a ripple voltage of an alternator for a vehicle and determining that the alternator is out of order when a difference between the maximum value and the minimum value of the ripple voltage exceeds a predetermined value.

CITATION LIST

Patent Literature

[PTL 1] Japanese Unexamined Patent Application Publication No. 2004-135393.

SUMMARY OF INVENTION

Technical Problem

In order to protect the electric compressor from the excessive current due to the resonance of the ripple voltage, it is necessary to be able to detect the vibration state of the ripple voltage.

The present disclosure provides a control device, an electric compressor, a ripple voltage detecting method, and a program which are capable of solving the above problems.

Solution to Problem

A control device of the present disclosure includes: an acquisition unit that samples a voltage value of an input voltage of an electric compressor driven by a battery at unequal intervals; and a waveform calculation unit that calculates a waveform of a ripple component of the input voltage, based on the voltage value that is sampled at unequal intervals.

The electric compressor of the present disclosure includes the above-described control device.

A ripple voltage detecting method of the present disclosure includes: sampling a voltage value of an input voltage of an electric compressor driven by a battery at unequal intervals; and calculating a waveform of a ripple component of the input voltage, based on the voltage value that is sampled at unequal intervals.

A program of the present disclosure causes a computer to function as: means for sampling a voltage value of an input voltage of an electric compressor driven by a battery at unequal intervals; and means for calculating a waveform of a ripple component of the input voltage, based on the voltage value that is sampled at unequal intervals.

Advantageous Effects of Invention

According to the above-described control device, program, it is possible to reliably detect an abnormality in a ripple voltage.

DESCRIPTION OF EMBODIMENTS

Embodiment

Hereinafter, an electric compressor according to an embodiment will be described with reference to FIGS. 1 to 5.

(Configuration)

Figure 1:
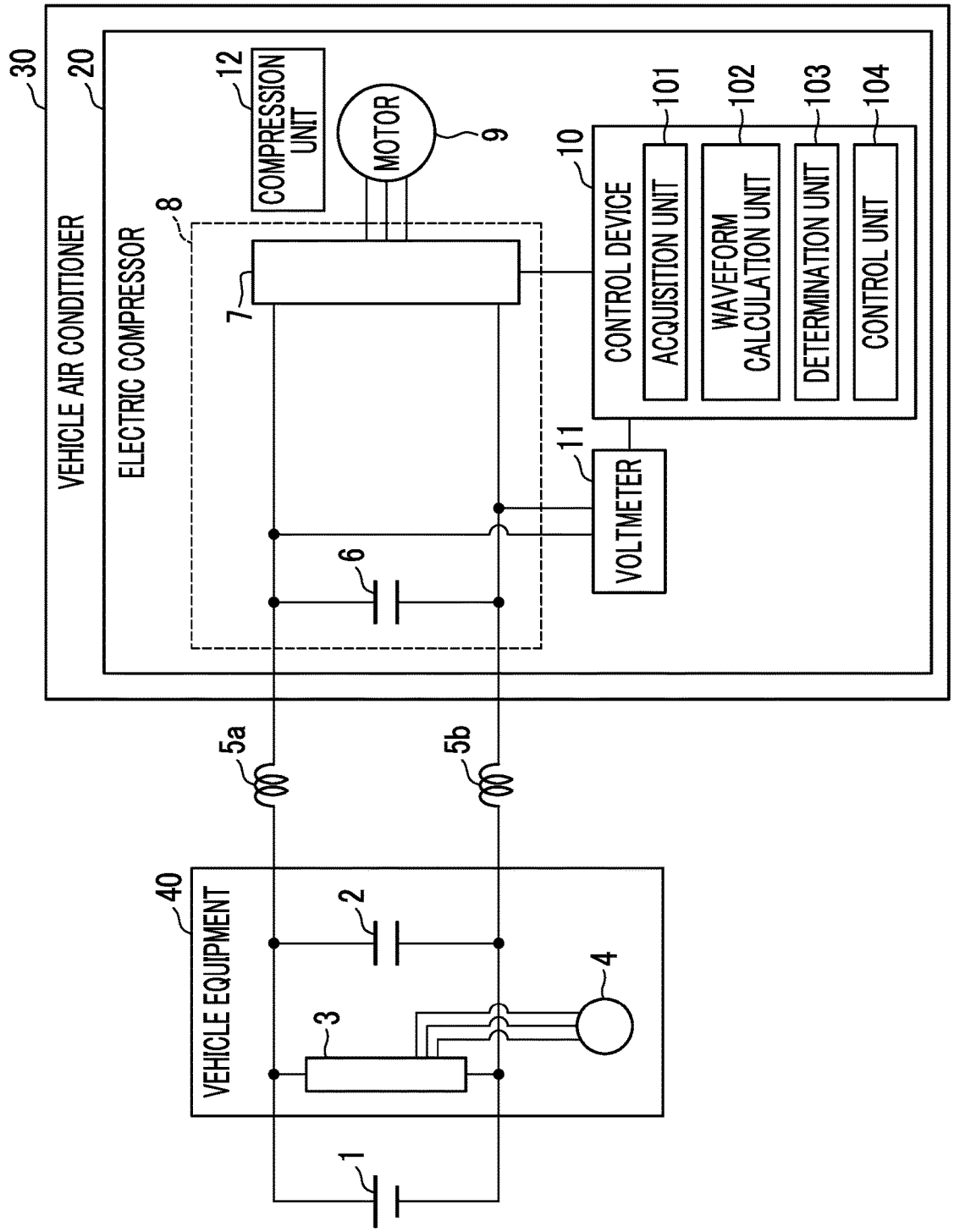
FIG. 1 is a diagram showing an example of an electric compressor in an embodiment.

FIG. 1 shows an example of a schematic configuration of an electric compressor 20 included in a vehicle air conditioner 30. A battery 1, the vehicle air conditioner 30, vehicle equipment 40, and an electric circuit for driving the battery 1, the vehicle air conditioner 30, and the vehicle equipment 40, illustrated, are mounted on the vehicle. Inductors 5a and 5b indicate the inductor components of the electric circuit including the battery 1, the vehicle air conditioner 30, and the vehicle equipment 40.

The battery 1 is a power supply unit mounted on a vehicle (outside the vehicle air conditioner 30). The battery 1 supplies high-voltage DC power to the vehicle air conditioner 30 and the vehicle equipment 40. The vehicle equipment 40 includes a capacitor 2, an inverter 3, and a load 4 connected to the inverter 3. In the vehicle equipment 40, the inverter 3 converts the high-voltage DC power supplied from the battery 1 into three-phase AC power, and supplies the three-phase AC power to the load 4. Assuming that the carrier frequency of the inverter 3 is f1, a ripple voltage (described later) having a frequency f1 originating from the vehicle equipment 40 may be generated in the electric circuit.

The vehicle air conditioner 30 includes the electric compressor 20. The electric compressor 20 is an inverter-integrated electric compressor in which the inverter 7 is integrally incorporated. The electric compressor 20 includes a power supply circuit 8 including a capacitor 6 and an inverter 7, a motor 9, a control device 10, a voltmeter 11, and a compression unit 12. The electric compressor 20 is driven by the inverter 7 converting the high-voltage DC power supplied from the battery 1 into three-phase AC power and applying the three-phase AC power to the motor 9. The inverter 7 and the motor 9 are connected by a power line. The inverter 7 converts the DC power supplied from the battery 1 into three-phase AC power and supplies the three-phase AC power to the motor 9. The inverter 7 is controlled by the control device 10. The control device 10 includes a microcomputer, and controls the motor 9 to execute a desired operation via the inverter 7, based on a control signal acquired from an Electric Control Unit (ECU) or the like (not shown). For example, the control device 10 controls the rotation speed of the motor 9. When the motor 9 is rotationally driven according to the instruction from the inverter 7, the compression unit 12 compresses the refrigerant and supplies the refrigerant to the refrigerant circuit (not shown) included in the vehicle air conditioner 30. The inverter 7, the voltmeter 11, and the control device 10 are connected by a signal line. The voltmeter 11 measures the DC voltage input to the inverter 7 and outputs the measured voltage value to the control device 10. The voltage measured by the voltmeter 11 is called an input voltage. The input voltage measured by the voltmeter 11 may include a ripple component. The value obtained by subtracting the DC voltage value derived from the battery 1 from the voltage value measured by the voltmeter 11 is called a ripple voltage. Assuming that the carrier frequency of the inverter 7 is f0, a ripple voltage having a frequency f0 originating from the electric compressor 20 may be generated in the electric circuit. When the ripple voltage of the frequency f0 or f1 becomes large, resonance occurs in the resonance circuit formed by the capacitors 2 and 6 and the inductors 5a and 5b, and an excessive current flows in the electric circuit of FIG. 1. Therefore, the control device 10 monitors the fluctuation of the voltage value measured by the voltmeter 11, determines that the ripple voltage is abnormal when the value W of the ripple voltage becomes equal to or higher than a predetermined threshold value α, stops or decelerates the motor 9, and performs resonance protection control to reduce the value W of the ripple voltage. Thus, the ripple voltage originating from the electric compressor 20 is reduced.

The control device 10 includes an acquisition unit 101, a waveform calculation unit 102, a determination unit 103, and a control unit 104.

The acquisition unit 101 samples the voltage value measured by the voltmeter 11 at unequal intervals.

The waveform calculation unit 102 calculates a waveform from voltage values sampled by the acquisition unit 101 at unequal intervals. The waveform calculated by the waveform calculation unit 102 is a ripple component of the input voltage, that is, a ripple voltage. The ripple voltage may include a voltage originating from the electric compressor 20 (inverter 7) and a voltage originating from the vehicle equipment 40 (inverter 3).

The determination unit 103 calculates the difference between the maximum value and the minimum value of the voltage value in a predetermined minute time, based on the waveform calculated by the waveform calculation unit 102. This value is called the value W of the ripple voltage. The determination unit 103 compares the value W of the ripple voltage with the predetermined threshold value α. When the value W of the ripple voltage is equal to or higher than the threshold value α, the determination unit 103 determines to perform resonance protection control for protecting the circuit from resonance. The resonance protection control is a control that reduces the rotation speed of the motor 9 to reduce the value W of the ripple voltage to be less than the threshold value.

The control unit 104 indicates the rotation speed of the motor 9 to the inverter 7. When the determination unit 103 determines to perform the resonance protection control, the control unit 104 stops the motor 9. Alternatively, the control unit 104 reduces the rotation speed of the motor 9 to a predetermined rotation speed X (rpm). When the motor 9 is stopped or the rotation speed is reduced, the value W of the ripple voltage originating from the electric compressor 20 can be reduced.

(Ripple Voltage Detection Process)

Figure 2:
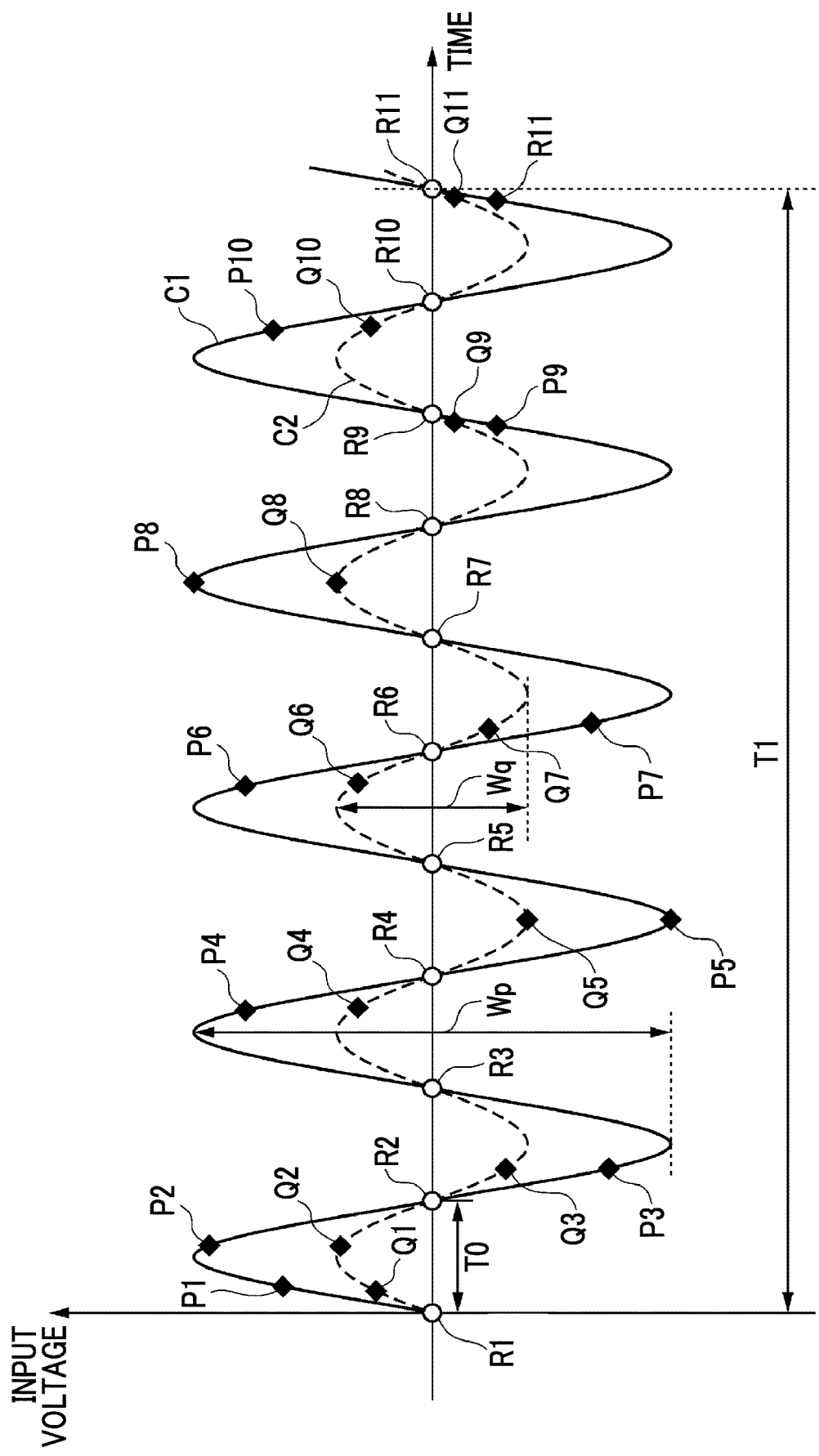
FIG. 2 is a diagram illustrating a ripple voltage detection process in the embodiment.

FIG. 2 is a diagram illustrating a ripple voltage detection process in one embodiment.

The vertical axis of FIG. 2 is the input voltage, and the horizontal axis is time. The diamond-shaped points plotted in FIG. 2 are voltage values of the input voltage sampled by the acquisition unit 101 at unequal intervals. Points P1 to P11 are voltage values continuously sampled in a certain unit time Tp (time width Ti), and points Q1 to Q11 are voltage values continuously sampled in another unit time Tq (time width Tl). The waveform calculation unit 102 calculates the waveform of the ripple voltage, based on the voltage values continuously sampled during the time width Ti. Taking points P1 to P11 as an example, the waveform calculation unit 102 assumes a certain sine wave (for example, y=a+b×sin(c)), and performs fitting by adjusting the parameters a to c of the assumed sine wave equation such that the value of the assumed sine wave at a time corresponding to each of the points P1 to P11 approximates the voltage values of the points P1 to P11. When an approximate sine wave can be calculated, the waveform calculation unit 102 uses the sine wave as the waveform of the ripple voltage at time Tp. The waveform C1 is a waveform of the ripple voltage calculated by the waveform calculation unit 102, based on the points P1 to P11. Similarly, the waveform C2 is a waveform of the ripple voltage at the time Tq calculated by the waveform calculation unit 102, based on the points Q1 to Q11. Wp is the value Wp of the ripple voltage indicated by the waveform C1, and Wq is the value Wq of the ripple voltage indicated by the waveform C2.

Here, it is assumed that the voltage value measured by the voltmeter 11 is sampled at a constant interval T0. Then, it is assumed that the values are all 0 as shown by points R1 to R11. In such a case, the amplitude of the ripple voltage always seems to be 0, based on the measured voltage value. However, in reality, there is a possibility that a ripple voltage such as waveform C1 or waveform C2 is generated. When the ripple voltage shown in the waveform C2 is generated and the value W of the ripple voltage exceeds the threshold value α, resonance occurs in the electric circuit of FIG. 1. When the input voltage is sampled at equal intervals in this way, for example, when the sampling interval of the input voltage and the cycle of the sine wave match, the vibration state of the ripple voltage may not be observed. Therefore, in the present embodiment, the acquisition unit 101 samples the input voltage at unequal intervals, and the waveform calculation unit 102 calculates the waveform based on those values. In this way, no matter what frequency the ripple voltage has, it is unlikely to miss the vibration.

The timings for sampling the voltage value at unequal intervals during the time width Ti may be predetermined, or may be randomly set by the acquisition unit 101 each time the time width Ti is elapsed. The length Ti of the unit time and the number of samplings during that period are determined such that the number of samples required for the waveform calculation can be obtained and the detection delay of the abnormal ripple voltage does not occur. For example, it is considered that the risk of detection omission of a ripple voltage due to the overlap of the ripple voltage cycle and the sampling cycle can be further reduced, by randomly changing the sampling interval on the unit time basis.

When the unit time Tp elapses, the waveform calculation unit 102 calculates the waveform C1 of the ripple voltage at the unit time Tp. The determination unit 103 compares the value Wp of the ripple voltage of the waveform C1 with the threshold value α, and determines to execute the resonance protection control when the value Wp of the ripple voltage is equal to or higher than the threshold value α. Similarly, when the waveform calculation unit 102 calculates the waveform C2 for the unit time Tq, the determination unit 103 compares the value Wq of the ripple voltage with the threshold value α. When the value Wq of the ripple voltage is equal to or higher than the threshold value α, the determination unit 103 determines to execute the resonance protection control. In this way, the control device 10 samples the input voltage at unequal intervals for each unit time Tp, calculates the waveform of the ripple voltage during this period, and monitors the behavior of the ripple voltage. When an abnormality is found in the value W of the ripple voltage, the control device 10 performs resonance protection control while continuing to monitor the ripple voltage.

Next, the resonance protection control will be described with reference to FIG. 3.

Figure 3:
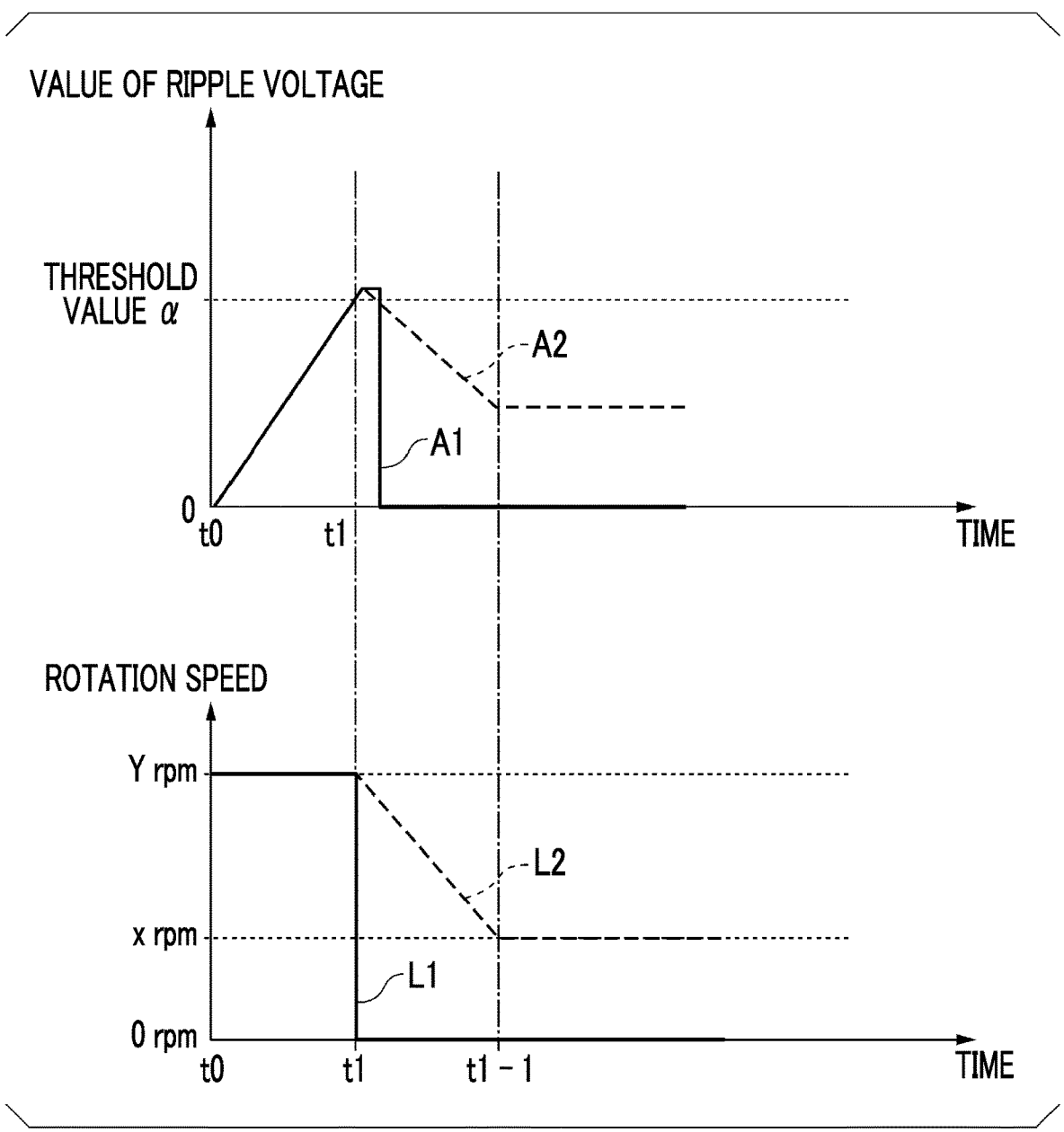
FIG. 3 is a diagram illustrating an example of resonance protection control in the embodiment.

FIG. 3 is a diagram illustrating an example of resonance protection control in the embodiment.

The vertical axis in the upper figure of FIG. 3 shows the value W of the ripple voltage originating from the electric compressor 20, and the horizontal axis shows time. The vertical axis in the lower figure of FIG. 3 shows the rotation speed of the motor 9, and the horizontal axis shows the time. The same position on the horizontal axes in the upper figure of FIG. 3 and the lower figure of FIG. 3 indicates the same time.

With reference to the upper figure of FIG. 3, the value W of the ripple voltage at time t0 is 0. With reference to the lower figure of FIG. 3, the rotation speed of the motor 9 at time t0 is Y (rpm). Y (rpm) is a required rotation speed determined by the ECU of the vehicle based on the set temperature of the heating and cooling set by the user.

At time t1, the value W of the ripple voltage becomes equal to or higher than the threshold value α. The determination unit 103 instructs the control unit 104 to execute the resonance protection control, based on the fact that the value W becomes equal to or higher than the threshold value α. Then, the control unit 104 indicates the rotation speed 0 (zero) to the inverter 7. Graph L1 shows the transition of the rotation speed of the motor 9 when the motor 9 is stopped, and graph A1 shows the transition of the value W of the ripple voltage. When the motor 9 is stopped, the value W of the ripple voltage also decreases as shown in the graph A1. This makes it possible to prevent the occurrence of resonance.

The control unit 104 may reduce the rotation speed of the motor 9 instead of stopping the motor 9. Graph L2 shows the transition of the rotation speed when the rotation speed of the motor 9 is reduced, and graph A2 shows the transition of the value W of the ripple voltage. The control unit 104 sets X (rpm), which is a value smaller than Y, as the target rotation speed, and indicates the rotation speed X to the inverter 7. Alternatively, the control unit 104 may sequentially set, to the target rotation speed, the rotation speed set in a stepwise manner from the required rotation speed Y (rpm) to the rotation speed X (rpm), indicate the rotation speed to the inverter 7 at predetermined time intervals, and reduce the rotation speed of the motor 9 to the rotation speed X in a stepwise manner. When instruction of reducing the rotation speed at time t1 is given, the rotation speed of the motor 9 gradually decreases, and decreases to X (rpm) at time t1-1. This makes it possible to prevent the occurrence of resonance. In the resonance protection control, by operating the motor 9 at the rotation speed X without stopping, the air conditioning by the vehicle air conditioner 30 can be continued even if it is weak, and the deterioration of the user's comfort can be reduced.

The abnormality in the ripple voltage may occur due to a transient phenomenon. When a predetermined time elapses after the value W of the ripple voltage of the motor 9 decreases below the threshold value α, regardless of whether the motor 9 is stopped or the rotation speed of the motor 9 is reduced, the control unit 104 determines that the transient factor that causes an abnormality in the ripple voltage may have been removed, and may perform control to increase the rotation speed of the motor 9 again toward the required rotation speed Y required by the vehicle air conditioner 30. Thus, the operating state of the vehicle air conditioner 30 can be brought closer to the operating state according to the load, so that user comfort can be restored. When the abnormality does not occur in the ripple voltage even if the rotation speed of the motor 9 is increased, the control unit 104 maintains the rotation speed of the motor 9 at Y (rpm). When the abnormality occurs again in the ripple voltage, the control unit 104 stops the motor 9 or reduces the rotation speed of the motor 9, and when a predetermined time elapses after the value W of the ripple voltage decreases below the threshold value α, the control unit 104 repeats the control to increase the rotation speed of the motor 9 toward the required rotation speed Y until the abnormality does not occur in the ripple voltage or the number of times of increasing the rotation speed of the motor 9 reaches a predetermined upper limit. When an abnormality occurs in the ripple voltage no matter how many times the rotation speed is increased, the control unit 104 maintains the motor 9 stopped. Thus, while preventing resonance due to the ripple voltage, if possible, air conditioning is performed by the vehicle air conditioner 30, and a decrease in user comfort can be reduced. The control unit 104 may not increase the rotation speed of the motor 9 to Y (rpm) at a time, but may increase the rotation speed in a stepwise manner toward the required rotation speed Y. In this case, even if the rotation speed of the motor 9 cannot be increased to Y, the control unit 104 may increase the rotation speed to the maximum rotation speed at which the abnormality does not occur in the ripple voltage and cause the motor 9 continue to operate as it is.

As shown in FIG. 3, when the source of the ripple voltage is the electric compressor 20, the control unit 104 can reduce the value W of the ripple voltage by reducing the rotation speed of the motor 9. However, when the source of the ripple voltage is the vehicle equipment 40, the abnormality in the ripple voltage cannot be removed by the control of the control device 10. For example, when the value W is equal to or higher than the threshold value α even if the rotation speed of the motor 9 is reduced, the source of the ripple voltage may be the vehicle equipment 40. When the source of the ripple voltage is the vehicle equipment 40, the control device 10 may wait until the value W of the ripple voltage becomes less than the threshold value α while the motor 9 is stopped. The control device 10 may record a log describing that an abnormality in the ripple voltage originating from the vehicle equipment 40 has occurred in a storage unit (not shown). For example, by providing the log to the manufacturer of the vehicle equipment 40, it is possible to request that the generation of an abnormal ripple voltage be suppressed.

Figure 4:
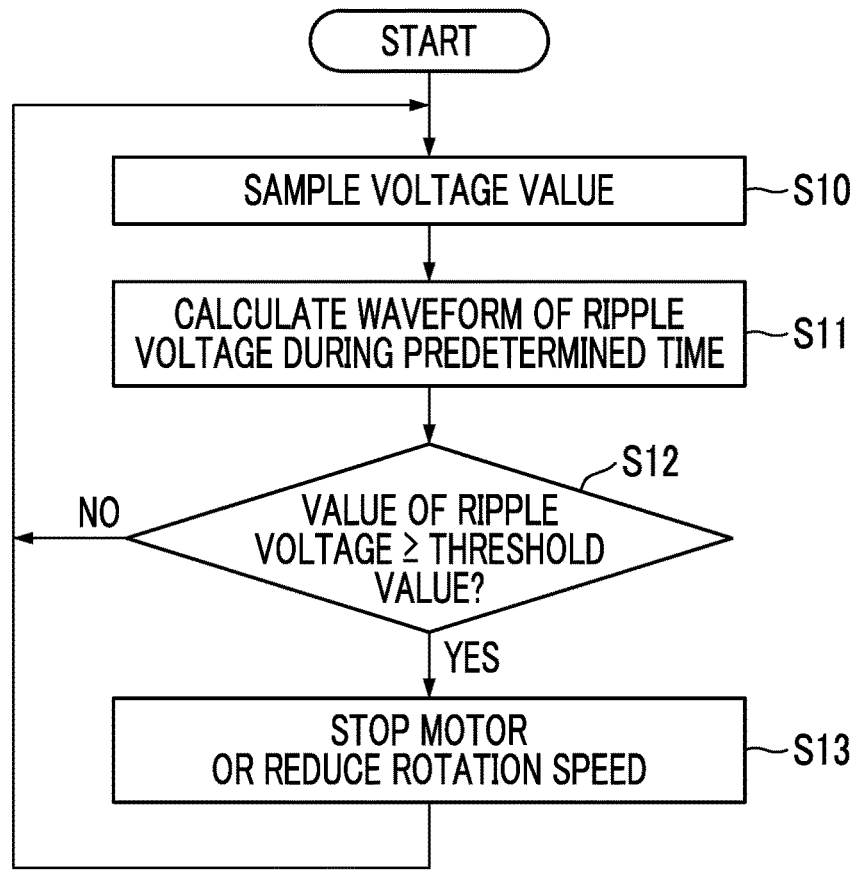
FIG. 4 is a flowchart showing an example of the control in the embodiment.

Next, the flow of the ripple voltage detection process and the resonance protection control of the present embodiment will be described. FIG. 4 is a flowchart showing an example of the control in the embodiment.

In the electric compressor 20, the motor 9 is driven at a required rotation speed Y according to the air conditioning load of the vehicle air conditioner 30. The acquisition unit 101 samples the latest voltage value measured by the voltmeter 11 at unequal intervals (step S10). The acquisition unit 101 outputs the sampled voltage value to the waveform calculation unit 102. The waveform calculation unit 102 calculates the waveform of the ripple voltage during a predetermined unit time (time width Tl) (step S11). For example, the waveform calculation unit 102 calculates the waveform of the ripple voltage by performing sine wave fitting on a plurality of voltage values acquired by the acquisition unit 101 at unequal intervals within a unit time. The waveform calculation unit 102 calculates the values W (for example, Wp and Wq in FIG. 2) of the ripple voltage for the calculated waveform. The waveform calculation unit 102 outputs the value W of the ripple voltage to the determination unit 103. The determination unit 103 compares the value W of the ripple voltage with the threshold value $\alpha$ (step S12). When the value W is less than the threshold value $\alpha$ (step S12; No), the determination unit 103 determines that the possibility of resonance due to the ripple voltage is low, and repeats the process from step S10.

When the value W of the ripple voltage is equal to or higher than the threshold value $\alpha$ (step S12; Yes), the determination unit 103 determines that resonance due to the ripple voltage may occur, and instructs the control unit 104 to start the resonance protection control. The control unit 104 stops the motor 9 or reduces the rotation speed of the motor 9 to a predetermined rotation speed X (rpm) (step S13). Even after the motor 9 is stopped or the like, the process from step S10 is repeated. When the resonance protection control is performed, for example, the rotation speed of the motor 9 may be increased again after a predetermined time has elapsed after the value W of the ripple voltage decreases below the threshold value $\alpha$. When the value W of the ripple voltage remains equal to or higher than the threshold value $\alpha$ even if the resonance protection control is performed, it is considered that the ripple voltage originating from the vehicle equipment 40 is abnormal. In such a case, the occurrence of an abnormality in the ripple voltage may be recorded in a log, or the vehicle equipment 40 may be notified of an alarm.

According to the present embodiment, the value of the input voltage of the electric compressor 20 is sampled at unequal intervals, and the waveform of the ripple voltage is calculated based on the sampling result. Thus, no matter what frequency the ripple voltage has, it is possible to detect the vibration without missing it and grasp the vibration state of the ripple voltage. By detecting without omission that the value W of the ripple voltage is equal to or higher than the threshold value $\alpha$ and executing the resonance protection control, resonance can be prevented and damage to the electric compressor 20 and the like can be prevented.

Figure 5:
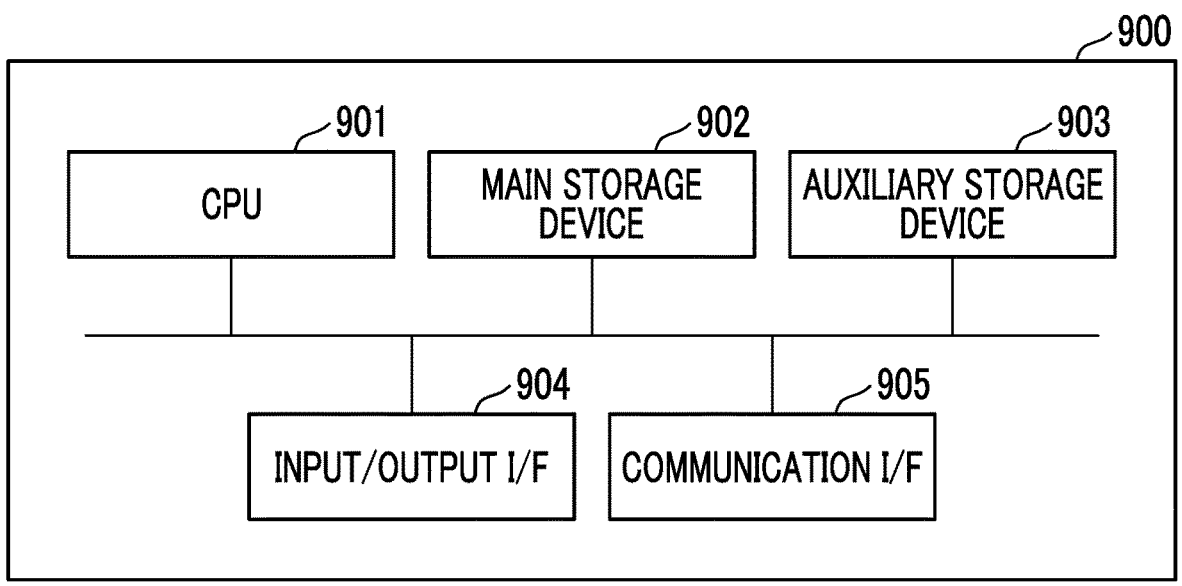
FIG. 5 is a diagram showing an example of a hardware configuration of a control device in the embodiment.

FIG. 5 is a diagram showing an example of a hardware configuration of the control device in the embodiment.

A computer 900 includes a CPU 901, a main storage device 902, an auxiliary storage device 903, an input/output interface 904, and a communication interface 905.

The control device 10 described above is mounted on the computer 900. Each of the above-described functions is stored in the auxiliary storage device 903 in the form of a program. The CPU 901 reads the program from the auxiliary storage device 903, extracts the program into the main storage device 902, and executes the above process according to the program. The CPU 901 secures a storage area in the main storage device 902 according to the program. The CPU 901 secures a storage area for storing the data being processed in the auxiliary storage device 903 according to the program.

A program for achieving all or a part of the functions of the control device 10 is recorded on a computer-readable recording medium, and the process by each functional unit may be performed by a computer system reading and executing the program recorded on the recording medium. The term "computer system" as used herein includes an OS and hardware such as peripheral devices. The "computer system" includes a homepage providing environment (or a display environment) when a WWW system is used. The "computer-readable recording medium" refers to a portable medium such as a CD, DVD, or USB, or a storage device such as a hard disk built in a computer system. When this program is delivered to the computer 900 through a communication line, the computer 900 receiving the delivered program may extract the program in the main storage device 902 and execute the above process. The above-described program may achieve a part of the above-described functions, or may further achieve the above-described functions in combination with the program already recorded in the computer system.

As described above, some embodiments according to the present disclosure have been described, but all of these embodiments are presented as examples and are not intended to limit the scope of invention. These embodiments can be implemented in various other embodiments, and various omissions, replacements, and changes can be made without departing from the gist of the invention. These embodiments and variations thereof are included in the scope of the invention described in the claims as well as in the equivalent scope and abstract of the invention.

<Additional Notes>

The control device 10, the electric compressor 20, the ripple voltage detecting method, and the program described in each embodiment are grasped as follows, for example.

(1) The control device 10 according to a first aspect includes an acquisition unit 101 that samples a voltage value of an input voltage of an electric compressor 20 driven by a battery 1 at unequal intervals, and a waveform calculation unit 102 that calculates a waveform of a ripple component of the input voltage, based on the voltage value that is sampled at unequal intervals.

According to the control device 10, the vibration state of the ripple voltage can be detected regardless of the frequency of the ripple voltage. This makes it possible to detect the abnormality in the ripple voltage without omission and avoid the occurrence of resonance due to the abnormality in the ripple voltage.

(2) The control device 10 according to a second aspect is the control device 10 of (1), in which the acquisition unit 101 performs the sampling at a plurality of time points (points P1 to P11, points Q1 to Q11) that are determined to divide a predetermined unit time (Tp, Tq) into unequal intervals, and the waveform calculation unit 102 calculates the waveform on the unit time basis.

Since time during which the number of samples of the voltage value required for the waveform calculation is obtained is set as a unit time and the voltage value can be sampled at unequal intervals within the unit time, a ripple voltage can be detected without omission.

(3) The control device 10 according to a third aspect is the control device 10 of (1), in which the acquisition unit 101 determines a plurality of time points for dividing a predetermined unit time (Tp, Tq) at unequal intervals, on the unit time basis to perform the sampling at each of the time points (points P1 to P11, and points Q1 to Q11), and the waveform calculation unit 102 calculates the waveform on the unit time basis.

By changing the sampling interval in various manners, the risk of detection omission of a ripple voltage due to the overlap of the ripple voltage cycle and the sampling cycle can be reduced.

(4) The control device 10 according to a fourth aspect is the control device 10 of (1) to (3), further including: a determination unit 103 that determines whether or not a value W of a ripple voltage indicated by the waveform is equal to or higher than a predetermined threshold value α; and a control unit 104 that reduces a rotation speed of a motor 9 of the electric compressor 20, when the value W of the ripple voltage is equal to or higher than the threshold value α.

When an abnormal ripple voltage is detected, the occurrence of resonance can be avoided by reducing (including stopping) the rotation speed of the motor 9.

(5) The electric compressor 20 according to a fifth aspect includes the control device 10 in (1) to (4).

(6) A ripple voltage detecting method according to a sixth aspect includes sampling a voltage value of an input voltage of an electric compressor 20 driven by a battery 1 at unequal intervals, and calculating a waveform of a ripple component of the input voltage, based on the voltage value that is sampled at unequal intervals.

(7) A program according to a seventh aspect causes a computer to function as: means for sampling a voltage value of an input voltage of an electric compressor driven by a battery at unequal intervals; and means for calculating a waveform of a ripple component of the input voltage, based on the voltage value that is sampled at unequal intervals.

INDUSTRIAL APPLICABILITY

According to the above-described control device, program, it is possible to reliably detect an abnormality in a ripple voltage.

REFERENCE SIGNS LIST

1 Battery
2 Capacitor
3 Inverter
4 Load
5a, 5b Inductor
6 Capacitor
7 Inverter
8 Power supply circuit
9 Motor
10 Control device
101 Acquisition unit
102 Waveform calculation unit
103 Determination unit
104 Control unit
11 Voltmeter
12 Compression unit
13 Storage device
20 Electric compressor
30 Vehicle air conditioner
40 Vehicle equipment
900 Computer
901 CPU
902 Main storage device
903 Auxiliary storage device
904 Input/output interface
905 Communication interface

The invention claimed is:

1. A control device comprising:
an acquisition unit that samples a voltage value of an input voltage of an electric compressor driven by a battery at unequal intervals;
a waveform calculation unit that calculates a waveform of a ripple component of the input voltage, based on the voltage value that is sampled at unequal intervals; and
a determination unit that determines a value of a ripple voltage is abnormal when the value of the ripple voltage indicates by the waveform is equal to or higher than a predetermined threshold value.

2. The control device according to claim 1, wherein
the acquisition unit performs the sampling at a plurality of time points that are determined to divide a predetermined unit time into unequal intervals, and
the waveform calculation unit calculates the waveform on the unit time basis.

3. The control device according to claim 2, further comprising:
a control unit that reduces a rotation speed of a motor of the electric compressor, when the value of the ripple voltage is equal to or higher than the threshold value.

4. The control device according to claim 1, wherein
The acquisition unit determines a plurality of time points for dividing a predetermined unit time at unequal intervals, on the unit time basis to perform the sampling at each of the time points, and
the waveform calculation unit calculates the waveform on the unit time basis.

5. The control device according to claim 4, further comprising:
a control unit that reduces a rotation speed of a motor of the electric compressor, when the value of the ripple voltage is equal to or higher than the threshold value.

6. The control device according to claim 1, further comprising:
a control unit that reduces a rotation speed of a motor of the electric compressor, when the value of the ripple voltage is equal to or higher than the threshold value.

7. An electric compressor comprising:
a control device comprising:
an acquisition unit that samples a voltage value of an input voltage of an electric compressor driven by a battery at unequal intervals:
a waveform calculation unit that calculates a waveform of a ripple component of the input voltage, based on the voltage value that is sampled at unequal intervals; and
a determination unit that determines a value of a ripple voltage is abnormal when the value of the ripple voltage indicated by the waveform is equal to or higher than a predetermined threshold value.

8. A ripple voltage detecting method comprising:
sampling a voltage value of an input voltage of an electric compressor driven by a battery at unequal intervals;
calculating a waveform of a ripple component of the input voltage, based on the voltage value that is sampled at unequal intervals; and determining a value of a ripple voltage is abnormal when the value of the ripple voltage indicated by the waveform is equal to or higher than a predetermined threshold value.

9. A non-transitory computer readable recording medium storing a program causing a computer to function as:
   means for sampling a voltage value of an input voltage of an electric compressor driven by a battery at unequal intervals;
   means for calculating a waveform of a ripple component of the input voltage, based on the voltage value that is sampled at unequal intervals; and
   means for determining a value of a ripple voltage is abnormal when the value of the ripple voltage indicated by the waveform is equal to or higher than a predetermined threshold value.

10. An electric compressor comprising:
    a control device comprising:
    an acquisition unit that samples a voltage value of an input voltage of an electric compressor driven by a battery at unequal intervals;
    a waveform calculation unit that calculates a waveform of a ripple component of the input voltage, based on the voltage value that is sampled at unequal intervals; and
    a determination unit that determines a value of a ripple voltage is abnormal when the value of the ripple voltage indicated by the waveform is equal to or higher than a predetermined threshold value, wherein
    the acquisition unit performs the sampling at a plurality of time points that are determined to divide a predetermined unit time into unequal intervals, and
    the waveform calculation unit calculates the waveform on the unit time basis.

11. An electric compressor comprising:
    a control device comprising:
    an acquisition unit that samples a voltage value of an input voltage of an electric compressor driven by a battery at unequal intervals;
    a waveform calculation unit that calculates a waveform of a ripple component of the input voltage, based on the voltage value that is sampled at unequal intervals; and
    a determination unit that determines a value of a ripple voltage is abnormal when the value of the ripple voltage indicated by the waveform is equal to or higher than a predetermined threshold value, wherein
    the acquisition unit determines a plurality of time points for dividing a predetermined unit time at unequal intervals, on the unit time basis to perform the sampling at each of the time points, and
    the waveform calculation unit calculates the waveform on the unit time basis.

12. An electric compressor comprising:
    a control device comprising:
    an acquisition unit that samples a voltage value of an input voltage of an electric compressor driven by a battery at unequal intervals;
    a waveform calculation unit that calculates a waveform of a ripple component of the input voltage, based on the voltage value that is sampled at unequal intervals; and
    a determination unit that determines a value of a ripple voltage is abnormal when the value of the ripple voltage indicated by the waveform is equal to or higher than a predetermined threshold value, and
    a control unit that reduces a rotation speed of a motor of the electric compressor, when the value of the ripple voltage is equal to or higher than the threshold value.

* * * * *